(12) United States Patent
Yoshida et al.

(10) Patent No.: US 9,352,549 B2
(45) Date of Patent: May 31, 2016

(54) SCREEN PRINTING APPARATUS AND SCREEN PRINTING METHOD

(71) Applicant: NISSAN MOTOR CO., LTD., Yokohama-shi, Kanagawa (JP)

(72) Inventors: Masao Yoshida, Zushi (JP); Kei Ono, Yokohama (JP); Masaya Yamamoto, Yokosuka (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/786,860

(22) PCT Filed: Mar. 26, 2014

(86) PCT No.: PCT/JP2014/058693
§ 371 (c)(1),
(2) Date: Oct. 23, 2015

(87) PCT Pub. No.: WO2014/174972
PCT Pub. Date: Oct. 30, 2014

(65) Prior Publication Data
US 2016/0075127 A1    Mar. 17, 2016

(30) Foreign Application Priority Data

Apr. 26, 2013    (JP) ................. 2013-093662

(51) Int. Cl.
*B41F 15/40*    (2006.01)
*B41F 15/44*    (2006.01)

(52) U.S. Cl.
CPC ................. *B41F 15/44* (2013.01); *B41F 15/40* (2013.01)

(58) Field of Classification Search
CPC .......... B41F 15/42; B41F 15/44; B41F 15/40; B41F 15/46; B41F 15/0818; B41F 15/085; H05K 3/12; H05K 3/1216; H05K 3/1233
USPC .......................................................... 101/123
IPC ....................... B41F 15/40, 15/42, 15/44, 15/46
See application file for complete search history.

(56) References Cited

U.S. PATENT DOCUMENTS 5,680,814 A * 10/1997 Lautzenhiser .......... B41F 15/44
                                                              101/123
2010/0242754 A1    9/2010 Nish et al.

FOREIGN PATENT DOCUMENTS

| JP | 05-077393 A    |   | 3/1993  |
|----|----------------|---|---------|
| JP | 2005305909 A   | * | 11/2005 |
| JP | 2007-062018 A  |   | 3/2007  |
| JP | 2009-190368 A  |   | 8/2009  |

* cited by examiner

*Primary Examiner* — Leslie J Evanisko
(74) *Attorney, Agent, or Firm* — Foley & Lardner LLP

(57) ABSTRACT

[Object] To provide a screen printing apparatus and a screen printing method with which it is possible to promote reuse of ink and thereby reduce the printing cost.
[Solution] A screen printing apparatus 101 includes an ink recovery mechanism 110 that recovers excess ink 81 discharged to a region in which a scraper 60 does not slide over a screen plate 50. By sliding a squeegee 70, the ink recovery mechanism guides the excess ink from a front side 71 of the squeegee to a region that is on a back side 72 of the squeegee 70 and in which the scraper slides over the screen plate.

11 Claims, 17 Drawing Sheets (A)

(B)

(C)

(D)

(A)

(B)

(C)

(D)

(A)

(B)

(C)

(D)

(A)

(B)

SCREEN PRINTING APPARATUS AND SCREEN PRINTING METHOD

TECHNICAL FIELD

The present invention relates to a screen printing apparatus and a screen printing method.

BACKGROUND ART

In response to recent social demands and trends in the context of energy and environment problems, fuel cells capable of operating even at ordinary temperature and obtaining high output density have attracted attention as a power supply for an electric car and a stationary power supply. A fuel cell is a clean power generation system in which an electrode reaction product is water in principle and which reduces the load on the global environment. In particular, a polymer electrolyte fuel cell (PEFC) is expected as a power supply for an electric car because it operates at relatively low temperature.

A polymer fuel cell includes a membrane electrode assembly (MEA, hereinafter referred to as MEA) having an electrolyte membrane, catalyst layers provided on both surfaces of the membrane, gas diffusion layers (GDLs), and so on. A plurality of MEAs are stacked with separators being disposed therebetween to constitute a fuel cell.

Examples of known technologies for making electrode catalyst layers on both sides of an electrolyte membrane when making a MEA include a method of applying catalytic ink to an electrolyte membrane by using a screen printing apparatus (see, for example, PTL 1).

A screen printing apparatus includes a screen plate, in which an opening for forming a print pattern is formed; a scraper that is slidable over the screen plate; and a squeegee that is slidable over the screen plate as the scraper is. By sliding the scraper over the screen plate, ink on the screen plate is spread and the opening is filled with the ink. Subsequently, by sliding the squeegee over the screen plate while pressing the screen plate against a workpiece, the ink, with which the opening is filled, is transferred to a surface of the workpiece.

A scraper described in PTL 1 includes a guide for scraping ink. With the guide, ink is prevented from flowing beyond a movable range of the scraper when the scraper slides.

CITATION LIST

Patent Literature

PTL 1: Japanese Unexamined Patent Application Publication No. 2009-190368

SUMMARY OF INVENTION

Technical Problem

However, with the technology described in PTL 1, when transferring ink to a workpiece, the ink may become spread beyond both ends of the sliding squeegee. Therefore, it is difficult to reuse the ink on the screen plate. Accordingly, there is a problem in that the amount of ink used cannot be reduced and it is difficult to reduce the printing cost.

An object of the present invention, which has been achieved under the circumstances described above, is to provide a screen printing apparatus and a screen printing method with which it is possible to promote reuse of ink and thereby reduce the printing cost.

Solution to Problem

To achieve the object, a screen printing apparatus according to the present invention includes a scraper that spreads ink on a screen plate, in which an opening is formed, and fills the opening with the ink by sliding over the screen plate; and a squeegee that transfers the ink, with which the opening is filled, to a surface of a workpiece by sliding over the screen plate while pressing the screen plate against the workpiece. The screen printing apparatus further includes an ink recovery mechanism that recovers excess ink that is discharged to a region in which the scraper does not slide over the screen plate. By sliding the squeegee, the ink recovery mechanism guides the excess ink from a front side of the squeegee to a region that is on a back side of the squeegee and in which the scraper slides over the screen plate, the front side facing the excess ink and the back side facing in a direction opposite to a direction in which the squeegee slides.

A screen printing method according to the present invention includes a filling operation and a transfer operation. In the filling operation, ink on a screen plate, in which an opening is formed, is spread and the opening is filled with the ink by sliding a scraper over the screen plate. In the transfer operation, the ink, with which the opening is filled, is transferred to a surface of a workpiece by sliding a squeegee over the screen plate while pressing the screen plate against the workpiece. In the transfer operation, excess ink that is discharged to a region in which the scraper does not slide over the screen plate is recovered. In the operation of recovering the excess ink, by sliding the squeegee, the excess ink is guided from a front side of the squeegee to a region that is on a back side of the squeegee and in which the scraper slides over the screen plate, the front side facing the excess ink and the back side facing in a direction opposite to a direction in which the squeegee slides. Then, the excess ink, which has been guided to the region on the back side, is spread again over the screen plate by next sliding of the scraper.

DESCRIPTION OF EMBODIMENTS

Figure 1:
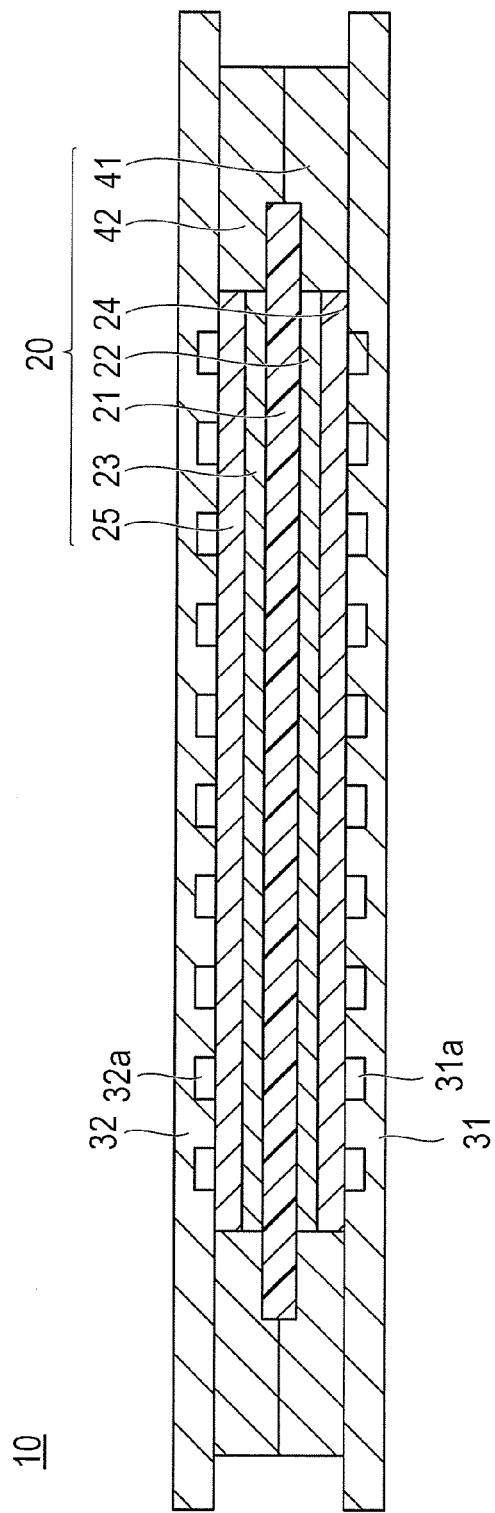
FIG. 1 is a cross-sectional view illustrating a cell structure of a fuel cell.

Embodiments of the present invention will be described below with reference to the attached drawings. In the description of the drawings, the same elements are denoted by the same reference numerals, and redundant descriptions thereof are skipped. The dimensional ratios in the drawings are exaggerated for convenience of explanation, and are different from actual ratios.

First Embodiment

FIG. 1 is a cross-sectional view illustrating a cell structure of a fuel cell.

Referring to FIG. 1, a unit cell 10, which is used for a polymer electrolyte fuel cell (PEFC) that uses hydrogen as a fuel, includes a MEA 20 and separators 31 and 32.

The MEA 20 includes a polymer electrolyte membrane 21, catalyst layers 22 and 23, gas diffusion layers (GDL) 24 and 25, and gaskets 41 and 42.

The catalyst layer 22 includes a catalytic component, an electroconductive catalyst carrier for supporting the catalytic component, and a polymer electrolyte. The catalyst layer 22 is an anode catalyst layer in which the hydrogen oxidation reaction occurs. The catalyst layer 22 is disposed on one side of the electrolyte membrane 21. The catalyst layer 23 includes a catalytic component, an electroconductive catalyst carrier for supporting the catalytic component, and a polymer electrolyte. The catalyst layer 23 is a cathode catalyst layer in which the oxygen reduction reaction occurs. The catalyst layer 23 is disposed on the other side of the electrolyte membrane 21.

The electrolyte membrane 21 has the function of selectively allowing protons generated by the catalyst layer 22 to pass therethrough into the catalyst layer 23 and the function as a barrier that prevents mixture of fuel gas supplied to the anode side and oxidant gas supplied to the cathode side.

The gas diffusion layer 24 is an anode gas diffusion layer for diffusing the fuel gas, which is supplied to the anode side.

The gas diffusion layer 24 is located between the separator 31 and the catalyst layer 22. The gas diffusion layer 25 is a cathode gas diffusion layer for diffusing the oxidant gas, which is supplied to the cathode side. The gas diffusion layer 25 is located between the separator 32 and the catalyst layer 23.

The gaskets 41 and 42, each having a frame-like shape, are disposed on both sides of the outer peripheral portion of the electrolyte membrane 21. The gasket 41 is positioned so as to surround the catalyst layer 22 (and the gas diffusion layer 24). The gasket 41 has a function of preventing the fuel gas, which is supplied to the catalyst layer 22, from leaking to the outside. The gasket 42 is positioned so as to surround the catalyst layer 23 (and the gas diffusion layer 25). The gasket 42 has a function of preventing the oxidant gas, which is supplied to the catalyst layer 23, from leaking to the outside.

The separators 31 and 32 have a function of electrically connecting the unit cells 10 in series and a function as a partition wall that isolates the fuel gas, the oxidant gas, and a coolant from each other. The separators 31 and 32, each having substantially the same shape as the MEA 20, are made by, for example, press-forming a stainless steel plate. A stainless steel plate is preferable because it is easy to perform complex machining on the stainless steel plate and because the stainless steel plate has high electroconductivity. As necessary, the stainless steel plate can be coated with an anti-corrosive material.

The separator 31 is an anode separator that is disposed on the anode side of the MEA 20 and faces the catalyst layer 22. The separator 31 has grooves 31a, which form a gas channel located between the MEA 20 and the separator 31. The grooves 31a are used to supply the fuel gas to the catalyst layer 22.

The separator 32 is a cathode separator disposed on the cathode side of the MEA 20 and faces the catalyst layer 23. The separator 32 has grooves 32a, which form a gas channel located between the MEA 20 and the separator 32. The grooves 32a are used to supply the oxidant as to the catalyst layer 23.

Next, the material, the size, and the like of each element will be described in detail.

To the electrolyte membrane 21, a fluorine-based electrolyte membrane formed of a perfluorocarbon sulfonic acid polymer, a hydrocarbon-based resin membrane containing a sulfonate group, or a porous membrane impregnated with an electrolytic component, such as phosphoric acid or ionic liquid, can be applied. Examples of perfluorocarbon sulfonic acid polymers are Nafion (registered trademark, manufactured by Du Pont Corporation), Aciplex (registered trademark, manufactured by Asahi Kasei Corporation), and Flemion (registered trademark, manufactured by Asahi Glass Co., Ltd.). The porous membrane is formed of, for example, polytetrafluoroethylene (PTFE) or polyvinylidene difluoride (PVDF).

While the thickness of the electrolyte membrane 21 is not particularly limited, it is preferably 5 to 300 μm, and more preferably 10 to 200 μm from the viewpoints of strength, durability, and output characteristics.

The catalytic component used in the catalyst layer (cathode catalyst layer) 23 is not particularly limited as long as it catalyzes a reduction reaction of oxygen. The catalytic component used in the catalyst layer (anode catalyst layer) 22 is not particularly limited as long as it catalyzes an oxidation reaction of hydrogen.

A specific catalytic component is selected from, for example, metals such as platinum, ruthenium, iridium, rhodium, palladium, osmium, tungsten, lead, iron, chromium, cobalt, nickel, manganese, vanadium, molybdenum, gallium, and aluminum, and an alloy of these metals. To enhance catalytic activity, poisoning resistance to carbon monoxide or the like, heat resistance, etc., the catalytic component preferably contains at least platinum. The catalytic component to be applied does not always need to be the same between the cathode catalyst layer and the anode catalyst layer, and can be changed appropriately.

While the conductive carrier of the catalyst used in the catalyst layers 22 and 23 is not particularly limited as long as it has a specific surface area such as to carrier the catalytic component in a desired diffused state and a sufficient electronic conductivity as a current collector, a main component thereof is preferably carbon particles. For example, the carbon particles are formed of carbon black, activated carbon, coke, natural graphite, or artificial graphite.

The polymer electrolyte used in the catalyst layers 22 and 23 is not particularly limited as long as it has at least high proton conductivity. For example, a fluorine-based electrolyte containing fluorine atoms in the entirety or a part of a polymer backbone, or a hydrocarbon-based electrolyte that does not contain fluorine atoms in a polymer backbone is applicable. While the polymer electrolyte used in the catalyst layers 22 and 23 may be the same as or different from the polymer electrolyte used in the electrolyte membrane 21, it is preferably the same from the viewpoint of enhancement of adhesion of the catalyst layers 22 and 23 to the electrolyte membrane 21.

The thickness of each catalyst layer is not particularly limited, as long as the catalyst layer can sufficiently perform a catalytic function in the hydrogen oxidation reaction (on the anode side) and the oxygen reduction reaction (on the cathode side). The thickness of a catalyst layer in existing fuel cells can be used. To be specific, preferably, the thickness of each catalyst layer is in the range of 1 to 20 μm.

The gas diffusion layers 24 and 25 are formed by using, as a base material, a conductive and porous sheet-shaped material, for example, fabric, paper-like paper-making material, felt, or nonwoven fabric made of carbon such as carbon fiber. While the thickness of the base material is not particularly limited, it is preferably 30 to 500 μm from the viewpoints of mechanical strength and permeability of gas and water. In the gas diffusion layers 24 and 25, the base material preferably contains a water repellent from the viewpoints of water repellency and suppression of a flooding phenomenon. Examples of the water repellent are a fluorine-based polymer material, such as PTFE, PVDF, polyhexafluoropropylene, or a tetrafluoroethylene-hexafluoropropylene copolymer (FEP), polypropylene, and polyethylene.

The material of the separators 31 and 32 is not limited to a stainless steel sheet, and other metal materials (for example, an aluminum plate or a clad material), or carbon, such as dense carbon graphite or a carbon plate, can be applied. When carbon is applied, the grooves 31a and 32a can be formed by cutting or screen printing.

The gaskets 41 and 42 each include a substrate and an adhesive layer, which is disposed on one side of the substrate to join the gaskets 41 and 42 to each other. The substrate is made from, for example, a rubber material, a fluorocarbon polymer material, or a thermoplastic resin. As the adhesive layer, for example, a hot-melt adhesive, which is a thermoplastic adhesive, may be used. Preferably, the thickness of each of the gaskets 41 and 42 is in the range of 10 μm to 2 mm.

Next, referring to FIGS. 2 to 6, a screen printing apparatus 101 will be described.

Figure 2:
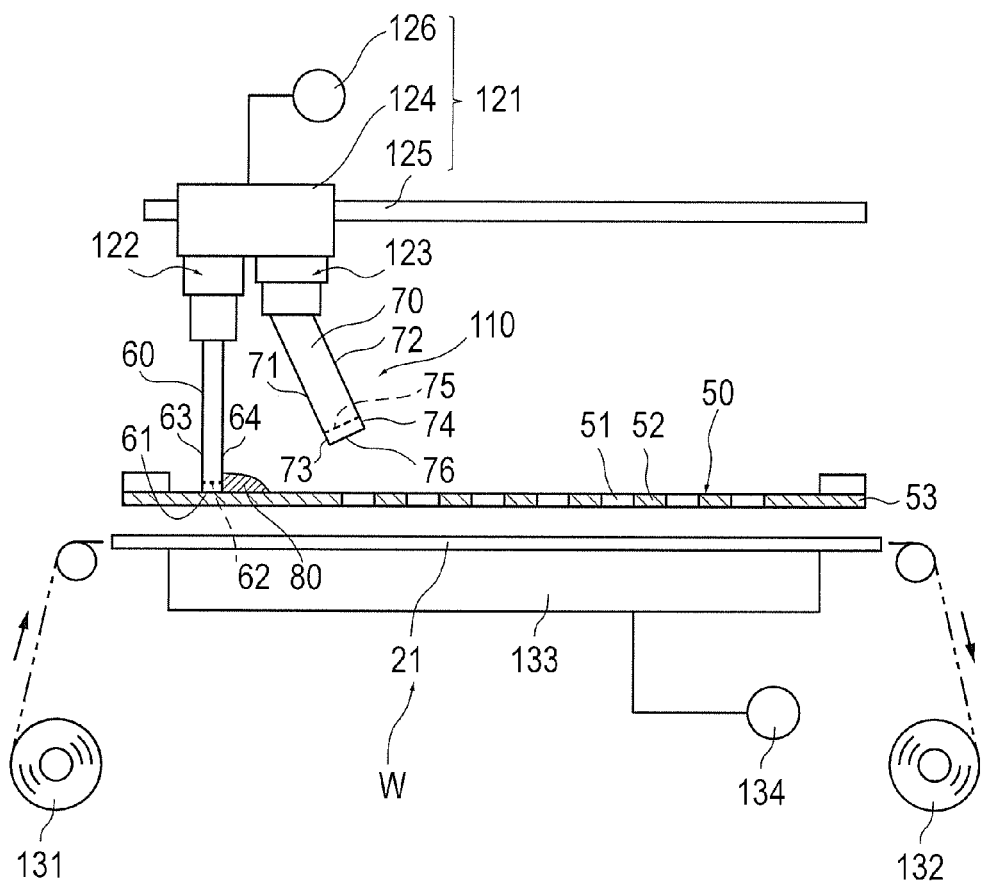
FIG. 2 is a schematic structural view illustrating a screen printing apparatus according to an embodiment.
Figure 3:
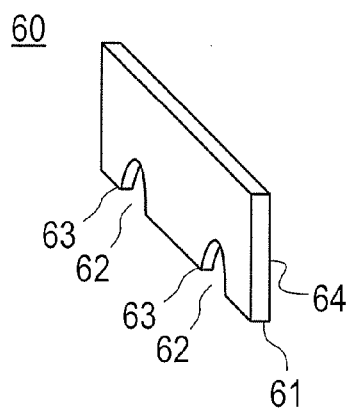
FIG. 3(A) is a perspective view illustrating a scraper.
FIGS. 3(B), 3(C), and 3(D) are respectively a perspective view, a bottom view, and a side view illustrating a squeegee.
Figure 3:
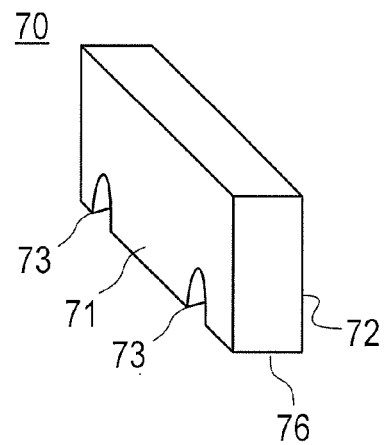
Figure 3:
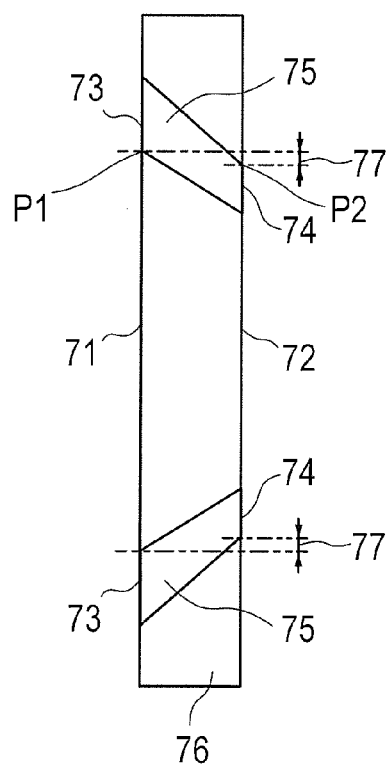
Figure 3:
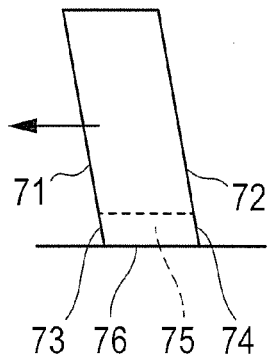
Figure 4:
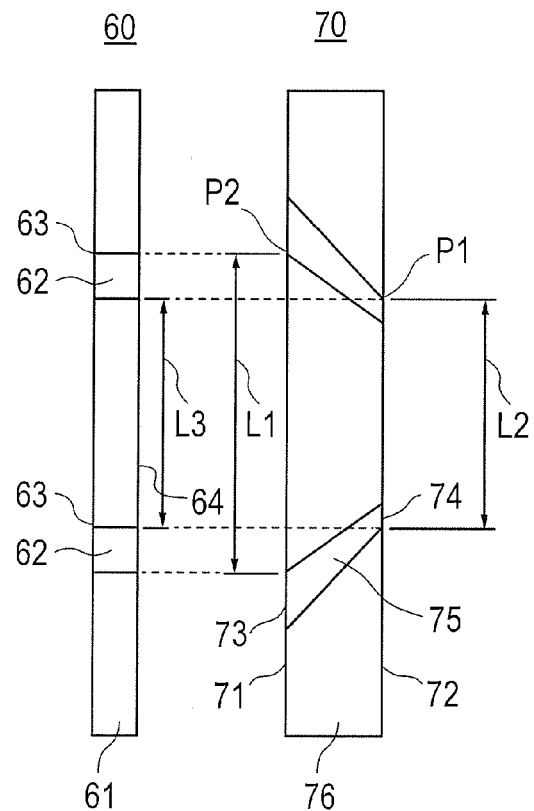
FIG. 4 is a schematic view illustrating the positional relationship and the dimensional relationship between ink inlets and ink outlets of the squeegee and a pressing surface of the scraper.
Figure 5:
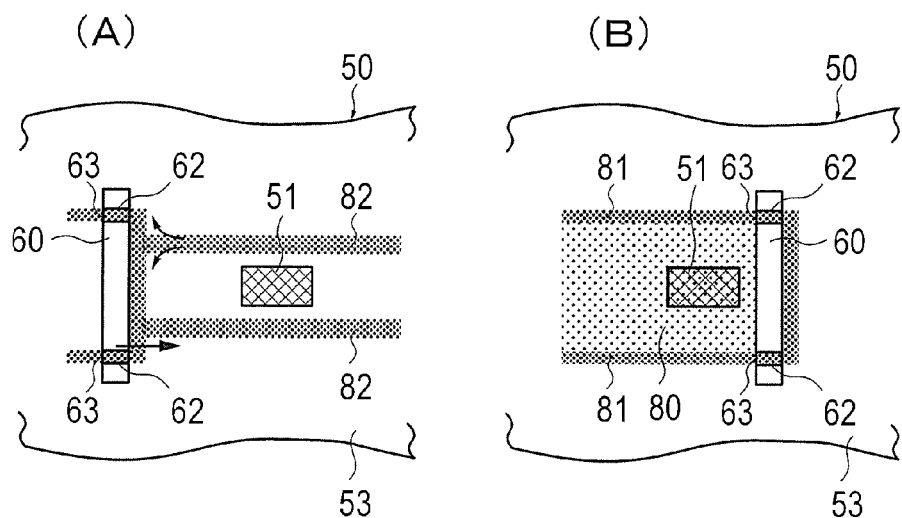
FIGS. 5(A) and 5(B) are schematic views illustrating a state in which, as the scraper slides, excess ink is discharged to a region in which the scraper does not slide over the screen plate.
Figure 6:
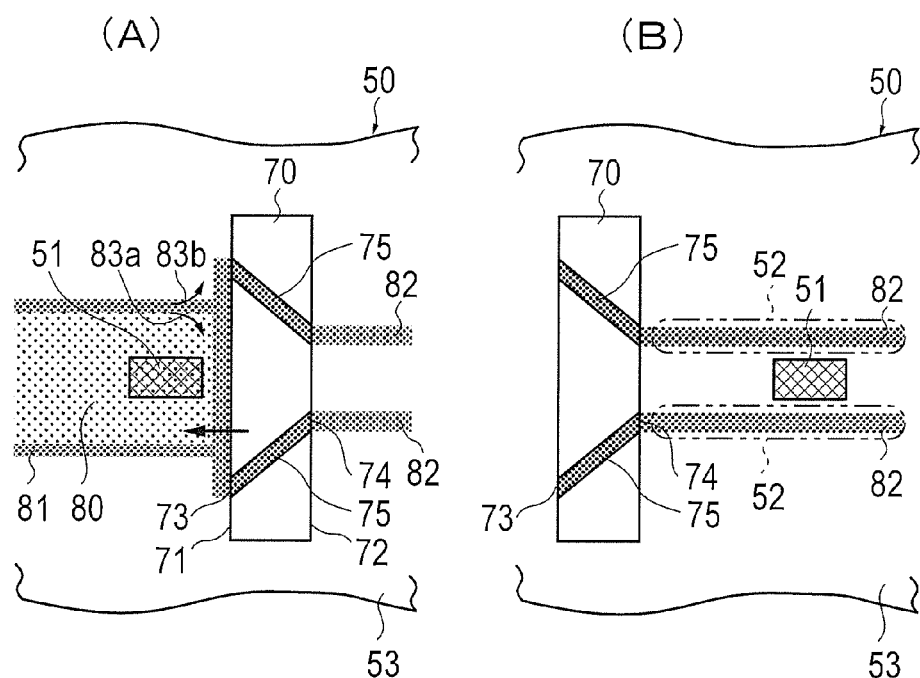
FIGS. 6(A) and 6(B) are schematic views illustrating a state in which, as the squeegee slides, excess ink is guided from the front side of the squeegee to a region on the back side of the squeegee.

FIG. 2 is a schematic structural view illustrating the screen printing apparatus 101 according to the embodiment. FIG. 3(A) is a perspective view illustrating a scraper 60; and FIGS. 3(B), 3(C), and 3(D) are respectively a perspective view, a bottom view, and a side view illustrating a squeegee 70. FIG. 4 is a schematic view illustrating the positional relationship and the dimensional relationship between ink inlets 73 and ink outlets 74 of the squeegee 70 and a pressing surface 64 of the scraper 60. FIGS. 5(A) and 5(B) are schematic views illustrating a state in which, as the scraper 60 slides, excess ink 81 is discharged to a region in which the scraper 60 does not slide over a screen plate 50. FIGS. 6(A) and 6(B) are schematic views illustrating a state in which, as the squeegee 70 slides, the excess ink 81 is guided from a front side 71 of the squeegee 70 to a region on a back side 72 of the squeegee 70.

In summary, the screen printing apparatus 101 includes the screen plate 50, the scraper 60, and the squeegee 70. An opening 51 for forming a print pattern is formed in the screen plate 50. The scraper 60 is slidable over the screen plate 50. The squeegee 70 is slidable over the screen plate 50 as the scraper 60 is. The scraper 60 spreads ink 80 on the screen plate 50 and fills the opening 51 with the ink 80 by sliding over the screen plate 50. The squeegee 70 transfers the ink 80, with which the opening 51 is filled, to a surface of the workpiece W by sliding over the screen plate 50 while pressing the screen plate 50 against the workpiece W. The opening 51 is filled with part of the ink 80 on the screen plate 50, and the remaining part of the ink 80 becomes the excess ink 81. The excess ink 81 is discharged to a region in which the scraper 60 does not slide over the screen plate 50. The screen printing apparatus 101 according to the present embodiment includes an ink recovery mechanism 110 that recovers the excess ink 81 discharged to the region in which the scraper 60 does not slide over the screen plate 50. By sliding the squeegee 70, the ink recovery mechanism 110 guides the excess ink 81 from the front side 71 of the squeegee 70 to a region that is on the back side 72 of the squeegee 70 and in which the scraper 60 slides over the screen plate 50, the front side 71 facing the excess ink 81 and the back side 72 facing in a direction opposite to the direction in which the squeegee 70 slides.

In the present embodiment, the electrolyte membrane 21, on which the electrode catalyst layers 22 and 23 are to be formed, is used as the workpiece W. The catalytic ink for the electrode catalyst layers 22 and 23 is used as the ink 80. The vertical direction in FIGS. 5(A) and 5(B) will be referred to as a width direction that crosses a direction (rightward in the figures) in which the scraper 60 slides. The vertical direction in FIGS. 6(A) and 6(B) will be referred to as a width direction that crosses the direction (leftward in the figures) in which the squeegee 70 slides. A numeral "80" will be generally used to denote ink, and a numeral "81" will be used to denote excess ink. A numeral "82" may be used to denote ink that is guided to the back side 72 of the squeegee 70. The details will be described below.

The screen printing apparatus 101 includes a sliding unit 121, a scraper elevator 122, and a squeegee elevator 123. The sliding unit 121 slides the scraper 60 and the squeegee 70 in a direction parallel to the surface of the screen plate 50. The scraper elevator 122 causes the scraper 60 to contact the screen plate 50 or to become separated from the screen plate 50. The squeegee elevator 123 causes the squeegee 70 to contact the screen plate 50 or to become separated from the screen plate 50.

The sliding unit 121 includes a sliding head 124, a slider 125, and a motor 126. The scraper 60 and the squeegee 70 are mounted on the sliding head 124. The slider 125 is inserted into the sliding head 124 and extends in the direction parallel to the surface of the screen plate 50. The motor 126 moves the sliding head 124 back and forth along the slider 125.

The scraper elevator 122 includes an elevation cylinder, which is attached to the sliding head 124. The scraper 60 is attached to an end of a piston rod of the elevation cylinder. Likewise, the squeegee elevator 123 includes an elevation cylinder, which is attached to the sliding head 124. The squeegee 70 is attached to an end of a piston rod of the elevation cylinder. Each elevation cylinder is a hydropneumatic cylinder that operates by using fluid pressure of air or hydraulic oil.

The sliding unit 121 and the scraper elevator 122 slide the scraper 60 over the screen plate 50 in a state in which the screen plate 50 is not pressed against the electrolyte membrane 21. The sliding unit 121 and the squeegee elevator 123 slide the squeegee 70 over the screen plate 50 while pressing the screen plate 50 against the electrolyte membrane 21.

The electrolyte membrane 21, which is the workpiece W, is shaped like a long strip, is wound around a supply reel 131, and is transported by using a roll-to-roll method. The electrolyte membrane 21 is unreeled from the supply reel 131 and successively wound around a winding reel 132. The screen printing apparatus 101 is disposed in a transport path along which the electrolyte membrane 21 is transported from the supply reel 131 to the winding reel 132.

The screen plate 50 includes a screen 53, which is made of a synthetic resin, such as nylon, or a metal, such as stainless steel. The screen plate 50 includes the opening 51 that allows the ink 80 to pass therethrough and a masking portion 52 that does not allow the ink 80 to pass therethrough. The opening 51 is formed by exposing the screen 53, and the masking portion 52 is formed by covering the screen 53. The screen plate 50 is disposed at a position that is separated from the electrolyte membrane 21, which is held on a support plate 133, with a clearance therebetween.

The support plate 133 is made from a porous member, such as a perforated plate having multiple pores. A suction mechanism 134, which makes the electrolyte membrane 21 to adhere to the surface of the support plate 133, is connected to the support plate 133. The suction mechanism 134 may have any appropriate structure for making the electrolyte membrane 21 to adhere to the support plate 133, such as a mechanism using a pressure difference or a mechanism using an electrostatic force. By performing screen printing in a state in which the electrolyte membrane 21 adheres to the surface of the support plate 133, the catalytic ink can be applied to the electrolyte membrane 21 without generating a crease or the like in the electrolyte membrane 21.

Referring to FIG. 3(A), the entirety of the scraper 60 according to the present embodiment has a rectangular shape. The scraper 60 includes escape portions 62, which are made by cutting out parts of a contact surface 61 along which the scraper 60 contacts the screen plate 50. The escape portions 62 each have a discharge opening 63, which faces in a direction opposite to the direction in which the scraper 60 slides. The escape portions 62 form a region in which the scraper 60 does not slide over the screen plate 50. A wall surface opposite to a wall surface in which the discharge openings 63 are formed serves as the pressing surface 64 for spreading the ink 80 on the screen plate 50. In the example shown in the figure, the escape portions 62 are disposed at positions at equal distances outward in the width direction from the center of the scraper 60 in the width direction. The escape portions 62 each have a semicircular arc shape. The number, the shapes, the heights, and the widths of the escape portions 62 are not particularly limited. These can be appropriately selected in consideration of the amount of the ink 80 to become the excess ink 81, the viscosity of the ink 80, the movement speed of the scraper 60, the inclination of the scraper 60, and the like. The material of the scraper 60 is not particularly limited and can be appropriately selected from, for example, metals, such as stainless steel; rubbers; and resin materials. The thickness of the scraper 60 is not particularly limited. When a stainless steel is used as the material, the thickness of the scraper 60 is, for example, about 2 mm.

Referring to FIGS. 3(B), 3(C), and 3(D), the entirety of the squeegee 70 according to the present embodiment has a rectangular shape. The squeegee 70 includes the ink inlets 73 having openings in the front side 71 of the squeegee 70, the ink outlets 74 having openings at positions closer to the back side 72 than the ink inlets 73, and ink paths 75 that connect the ink inlets 73 to the ink outlets 74. As illustrated in FIG. 3(D), the squeegee 70 is attached to the squeegee elevator 123 in a state in which the squeegee 70 is inclined toward the sliding direction. A bottom surface 76 of the squeegee 70 is chamfered to increase a contact area over which the squeegee 70 contacts the screen plate 50. With such a structure, regarding a back part of the bottom surface 76 of the squeegee 70 on a side opposite to the sliding direction, a vertical gap between the back part and the screen plate 50 is reduced. Thus, leakage of the excess ink 81, which has been introduced from the ink inlets 73 to the ink paths 75, from the ink paths 75 while the excess ink 81 flows in the ink paths 75, is suppressed; and the excess ink 81 reaches the ink outlets 74. Accordingly, the excess ink 81 can be easily moved through the ink paths 75 formed in the squeegee 70 to the positions at which the ink outlets 74 have openings.

As illustrated in FIG. 3(C), the ink paths 75 are disposed at positions at equal distances outward in the width direction from the center of the squeegee 70 in the width direction. The ink paths 75 each have a semicircular arc shape. The ink outlets 74 are located closer to the center of the squeegee 70 in the width direction than the ink inlets 73. The position P2 of an outer part of each of the ink outlets 74 in the width direction is closer to the center of the squeegee 70 in the width direction than the position P1 of a center-side part of a corresponding one of the ink inlets 73 in the width direction. In the present specification, the distance between the position P2 of the outer part of the ink outlet 74 in the width direction and the position P1 of the center-side part of the ink inlet 73 in the width direction will be referred to as a gap 77. The state illustrated in the figure is a state in which "the gap 77 is present".

The number, the shapes, the heights, and the widths of the ink paths 75 are not particularly limited. These can be appropriately selected in consideration of the amount of the ink 80 to become the excess ink 81, the viscosity of the ink 80, the movement speed of the squeegee 70, the inclination of the squeegee 70, and the like. The material of the squeegee 70 is not particularly limited and can be appropriately selected from, for example, metals, such as stainless steel; rubbers; and resin materials. The thickness of the squeegee 70 is not particularly limited. When a resin material is used as the material, the thickness of the squeegee 70 is, for example, about 9 mm.

Preferably, the opening areas of the ink inlets 73 of the ink path 75 are greater than those of the ink outlets 74. This is because, when the squeegee 70 slides, the excess ink 81 can be introduced into the ink paths 75 without overflowing from the ink paths 75.

FIG. 4 is a schematic view illustrating the positional relationship and the dimensional relationship between the ink inlets 73 and the ink outlets 74 of the squeegee 70 and the pressing surface 64 of the scraper 60. FIG. 4 shows an example in which the scraper 60 has the pair of escape portions 62 and the squeegee 70 has the pair of ink paths 75.

In order to recover and reuse the excess ink 81, it is necessary that, after the squeegee 70 has returned to the initial position, the ink 80 has been collected to a region inside of a range of the pressing surface 64 of the scraper 60, that is, a region inside in the width direction of a range over which the scraper 60 spreads the ink 80.

For this purpose, it is necessary that the length L1 between wall surfaces of the ink inlets 73 located closer to the center in the width direction be greater than the length L2 between wall surfaces of the ink outlets 74 located outward in the width direction, and it is necessary that the width L3 of the pressing surface 64 of the scraper 60 be greater than or equal to L2.

Referring to FIGS. 5(A) and 5(B), when the scraper 60 slides over the screen plate 50, the excess ink 81 is discharged to a region in which the scraper 60 does not slide over the screen plate 50. Because the escape portions 62 are formed, the excess ink 81, which is discharged as the scraper 60 slides, extends in strip-like shapes along the movement paths of the discharge openings 63 of the escape portions 62 of the scraper 60. In accordance with the positions of the escape portions 62, the excess ink 81 can be formed into strip-like shapes at desired positions in the width direction of the scraper 60.

The ink recovery mechanism 110 according to the present embodiment includes the ink paths 75, which are formed in the squeegee 70; and the drive unit that slides the squeegee 70 over the screen plate 50 while pressing the screen plate 50 against the electrolyte membrane 21. The sliding unit 121 and the squeegee elevator 123 correspond to the drive unit. When the squeegee 70 slides, the excess ink 81 can be easily moved to a desired position through the ink paths 75 of the squeegee 70 and the ink 80 can be recovered without fail.

Referring to FIGS. 6(A) and 6(B), by sliding the squeegee 70 using the drive unit, the excess ink 81 is guided from the ink inlets 73, into the ink paths 75, and out from the ink outlets 74. Ink 82 that has been guided out from the ink outlets 74 extends in strip-like shapes along the movement paths of the ink outlets 74 of the squeegee 70.

The positions of the ink outlets 74 are in a region that is on the back side 72 of the squeegee 70 and in which the scraper 60 slides over the screen plate 50. By disposing the ink outlets 74 at these positions, the excess ink 81, which has been recovered due to sliding of the squeegee 70, can be reused and the ink 80 can be spread over the screen plate 50 by next sliding of the scraper 60.

Preferably, the ink recovery mechanism 110 guides the excess ink 81 to regions in which the masking portion 52 of the screen plate 50 is formed (for example, regions surrounded by two-dot chain lines in FIG. 6(B)). Therefore, preferably, the ink outlets 74 are disposed at positions such that the movement paths of the ink outlets 74 do not overlap the opening 51. This is because, if the excess ink 81 is guided to a region in which the opening 51 of the screen plate 50 is present, that is, a print pattern region, variations in the thickness of applied ink may occur.

When the squeegee 70 slides, by being pushed by the squeegee 70, part of the excess ink 81 spreads inward in the width direction of the squeegee 70 (arrow 83a in FIG. 6(A)) and the remaining part of the excess ink 81 spreads outward in the width direction (arrow 83b in FIG. 6(A)). Therefore, preferably, the ink inlets 73 are disposed at positions outward in the width direction from the positions of the excess ink 81 when viewed in the width direction. This is because the excess ink 81, which tends to spread outward in the width direction of the squeegee 70 when the squeegee 70 slides, can be guided into the ink inlets 73.

Next, the operations of the present embodiment will be described.

FIGS. 7(A) to 7(E) illustrate the process of screen printing. Screen printing is performed through a filling step (FIGS. 7(A) and 7(B)) and a transfer step including a recovery step (FIGS. 7(C), 7(D), and 7(E)).

Figure 7:
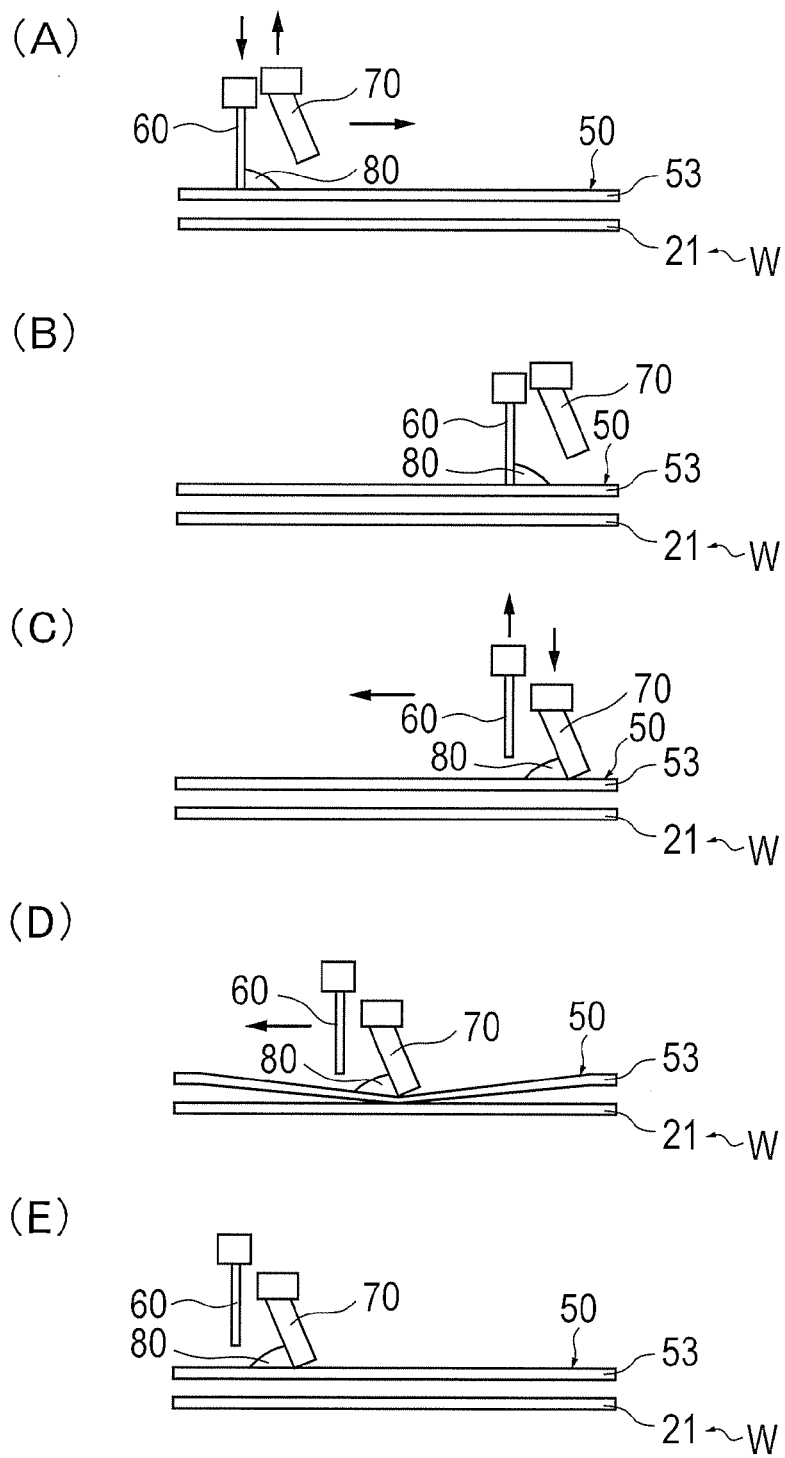
FIGS. 7(A) to 7(E) illustrate the process of screen printing. The screen printing is performed through a filling step and a transfer step including a recovery step.

First, the electrolyte membrane 21, which is unreeled from the supply reel 131, is made to adhere to a surface of the support plate 133. A predetermined amount of the ink 80 is supplied onto the masking portion 52 of the screen plate 50. As illustrated in FIGS. 7(A) and 7(B), by sliding the scraper 60 over the screen plate 50, in which the openings 51 are formed, the ink 80 on the screen plate 50 is spread and the opening 51 is filled with the ink 80 (filling step). In the filling step, by using the sliding unit 121 and the scraper elevator 122, the scraper 60 is slid over the screen plate 50 in a state in which the screen plate 50 is not pressed against the electrolyte membrane 21.

Next, as illustrated in FIGS. 7(C), 7(D), and 7(E), by sliding the squeegee 70 over the screen plate 50 while pressing the screen plate 50 against the electrolyte membrane 21, the ink 80, with which the opening 51 is filled, is transferred to a surface of the electrolyte membrane 21 (transfer step). In the transfer step, by using the sliding unit 121 and the squeegee elevator 123, the squeegee 70 is slid over the screen plate 50 while pressing the screen plate 50 against the electrolyte membrane 21.

In the recovery step, which is included in the transfer step, the excess ink 81 that has been discharged to a region in which the scraper 60 does not slide over the screen plate 50 is recovered.

In the recovery step, as illustrated in FIGS. 6(A) and 6(B), the excess ink 81 is guided to a region in which the scraper 60 slides over the screen plate 50 by sliding the squeegee 70, and the excess ink 81 is recovered in such a way that the excess ink 81 is spread over the screen plate 50 again by next sliding of the scraper 60. To be specific, the excess ink 81 is guided through the ink paths 75 of the squeegee 70 from the front side 71 of the squeegee 70 to a region that is on the back side 72 of the squeegee 70 in which the scraper 60 slides over the screen plate 50. Then, as illustrated in FIGS. 5(A) and 5(B), the ink 80, which has been guide to the region on the back side 72, is spread again over the screen plate 50 by next sliding of the scraper 60. Thus, the ink 80 on the screen plate 50 is reused.

When an ink having high viscosity, such as a solder paste or a resist ink, is used, a heap of ink formed by the scraper does not considerably collapse over time. Therefore, by using only one of a squeegee and a scraper and by forming a heap of ink at a predetermined position, spreading of the ink can be prevented. However, in a case where the ink 80 has a comparatively low viscosity, such as the catalytic ink in the present embodiment, even if a heap is formed, spreading of the ink occurs over time. Therefore, it is necessary to recover the excess ink 81 quickly.

For this reason, the present embodiment uses a method of recovering the excess ink 81, which has a strip-like shape and which is formed due to a forward sliding movement of the scraper 60, by using the backward sliding movement of the squeegee 70. By doing so, before a heap of ink collapses and the ink becomes spread, the excess ink 81 can be recovered without fail.

Moreover, because it is not necessary to make catalytic ink having a high viscosity by increasing the solid content concentration, the ink can be applied with a uniform thickness and it is not likely that variations in the performance of electrodes increase.

It may be possible to scrape the excess ink from lateral directions by using a recovery device that is independent from the scraper and the squeegee and that moves into and out of the movement range of the scraper and the squeegee from lateral directions. As compared with such a recovery device, the recovery mechanism 110 according to the present embodiment has a simpler structure and does not give a negative influence on production speed and print quality.

In a case where a general-purpose inexpensive ink is used, it is not necessary to increase the ink recovery rate by increasing the complexity of the device structure and the number of processing steps. However, in the present embodiment, the ink 80 is catalytic ink for the electrode catalyst layers 22 and 23, which includes expensive catalyst substances. Therefore, it is one of important objectives to increase ink recovery ratio even by increasing the complexity of the device structure and the number of processing steps. Because the ink recovery ratio affects the product cost, the product competitiveness can be increased in terms of cost by increasing the ink recovery rate.

As described above, the screen printing apparatus 101 according to the present embodiment includes the ink recovery mechanism 110, which recovers the excess ink 81 discharged to a region in which the scraper 60 does not slide over the screen plate 50. By sliding the squeegee 70, the ink recovery mechanism 110 guides the excess ink 81 from the front side 71 of the squeegee 70 to a region that is on the back side 72 of the squeegee 70 and in which the scraper 60 slides over the screen plate 50.

In the screen printing method according to the present embodiment, the transfer step includes the recovery step of recovering the excess ink 81 discharged to a region in which the scraper 60 does not slide over the screen plate 50. In the recovery step, by sliding the squeegee 70, the excess ink 81 is guided to a region in which the scraper 60 slides over the screen plate 50 and the excess ink 81 is spread again over the screen plate 50 by next sliding of the scraper 60.

With the screen printing apparatus 101 and the screen printing method, the excess ink 81, which has been discharged to a region in which the scraper 60 does not slide over the screen plate 50, moves to a region in which the scraper 60 slides over the screen plate 50 when the squeegee 70 is slid. Accordingly, by next sliding of the scraper 60, the excess ink 81 recovered due to sliding of the squeegee 70 is reused and the ink 80 can be spread over the screen plate 50. Accordingly, reuse of the ink 80 on the screen plate 50 can be promoted, the amount of the ink 80 used can be reduced, and, as a result, it is possible to reduce the printing cost.

The ink recovery mechanism 110 has the ink paths 75, which are formed in the squeegee 70; and the drive unit (the sliding unit 121 and the squeegee elevator 123), which slides the squeegee 70 over the screen plate 50 while pressing the screen plate 50 against the electrolyte membrane 21. The ink recovery mechanism 110 guides the excess ink 81 from the ink inlets 73 into the ink paths 75 and guides the excess ink out from the ink outlets 74. With such a structure, when the squeegee 70 slides, the excess ink 81 can be easily moved to a desired position through the ink paths 75 formed in the squeegee 70, and the ink 80 can be recovered without fail.

The screen plate 50 includes the masking portion 52, which does not allow the ink 80 to pass therethrough, and the ink recovery mechanism 110 guides the excess ink 81 to a region in which the masking portion 52 of the screen plate 50 is formed. With such a structure, the excess ink 81 is not guided to a region in which the opening 51 of the screen plate 50 is present, that is, a print pattern region. Therefore, variations in the thickness of the applied ink 80 do not occur, and the catalytic ink can be applied with a uniform thickness.

The ink recovery mechanism 110 recovers the excess ink 81 at a position outward in a width direction from the position of the excess ink 81 when viewed in the width direction that crosses the direction in which the squeegee 70 slides. With such a structure, the excess ink 81, which tends to spread outward in the width direction of the squeegee 70 when the squeegee 70 slides, can be guided into the ink inlets 73, and the ink 80 can be recovered without fail.

The scraper 60 has the escape portions 62, which have the discharge openings 63 in apart of the contact surface 61 along which the scraper 60 contacts the screen plate 50. The excess ink 81 spreads along strip-like shapes extending along the movement paths of the discharge openings 63 of the escape portions 62 of the scraper 60. With such a structure, by changing the positions of the escape portions 62, the excess ink 81 can be formed into strip-like shapes at desired positions of the scraper 60 in the width direction at the same time, and the excess ink 81 can be guided from the desired positions on the front side 71 of the squeegee 70 to the back side 72 of the squeegee 70.

The opening areas of the ink inlets 73 of the ink paths 75 are greater than those of the ink outlets 74. With such a structure, when the squeegee 70 slides, the excess ink 81 can be guided into the ink paths 75 without overflowing from the ink paths 75, and the ink 80 can be recovered without fail.

The workpiece W is the electrolyte membrane 21, on which the electrode catalyst layers 22 and 23 are to be formed, and the ink 80 is catalytic ink for the electrode catalyst layers 22 and 23. With such a structure, reuse of the catalytic ink on the screen plate 50 can be promoted; the amount of catalytic ink used, which is comparative expensive, can be reduced; and, as a result, reduction of printing cost and reduction of the cost of manufacturing the MEA can be reduced.

(Modifications of Scraper)

Figure 8:
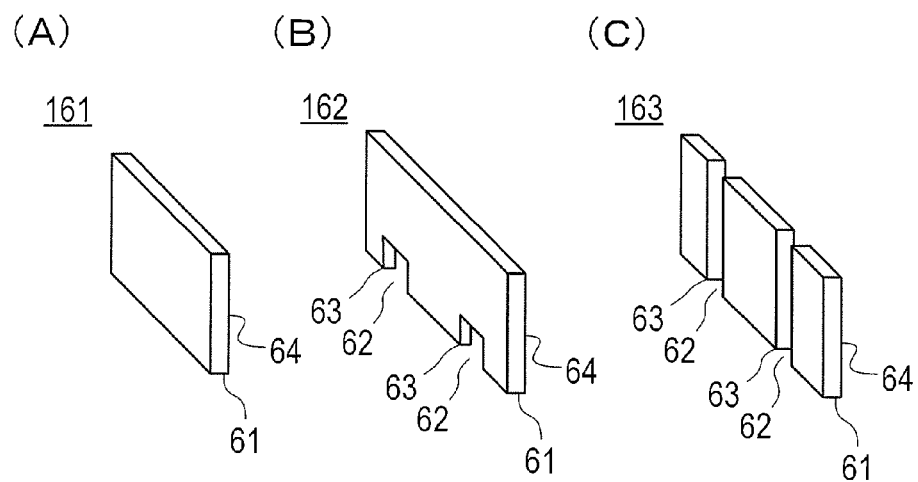
FIGS. 8(A), 8(B), and 8(C) are perspective views illustrating scrapers according to modifications.

FIGS. 8(A), 8(B), and 8(C) are perspective views illustrating scrapers 161, 162, and 163 according to modifications.

As illustrated in FIG. 8(A), the scraper 161 may have a single plate-like shape as with existing known scrapers. The scraper 161 has the contact surface 61 between both end portions thereof in a width direction that crosses a direction in a direction in which the scraper 161 slides. The contact surface 61 contacts the screen plate 50 continuously and without a gap. Namely, the scraper 161 does not have the escape portion 62 in the contact surface 61 along which the scraper 161 contacts the screen plate 50. As illustrated in FIG. 8(B), the scraper 162 may have rectangular escape portions 62. As illustrated in FIG. 8(C), the scraper 163 may have slit-shaped escape portions 62.

Figure 9:
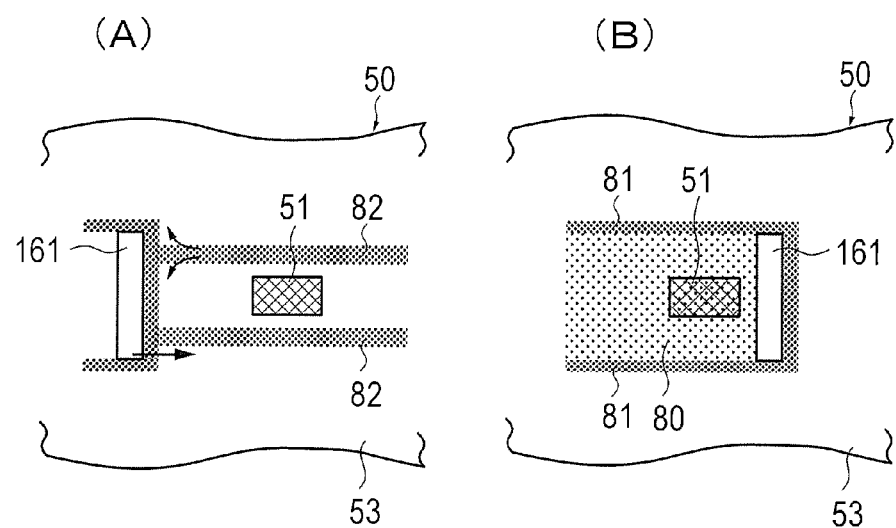
FIGS. 9(A) and 9(B) are schematic views illustrating a state in which, as a scraper that does not have an escape portion (FIG. 8(A)) slides, excess ink is discharged to a region in which the scraper does not slide over the screen plate.
Figure 10:
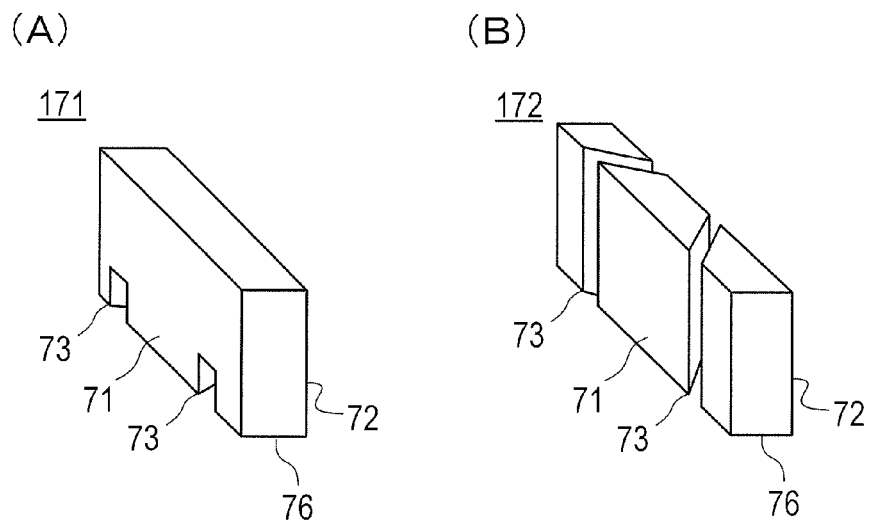
FIGS. 10(A) and 10(B) are perspective views illustrating squeegees according to modifications.
Figure 11:
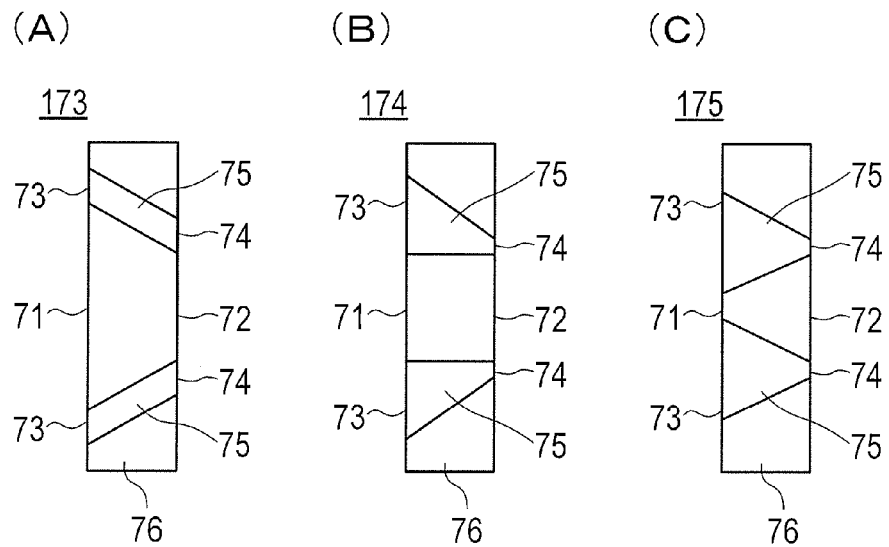
FIGS. 11(A), 11(B), and 11(C) are bottom views illustrating squeegees according to other modifications.
Figure 12:
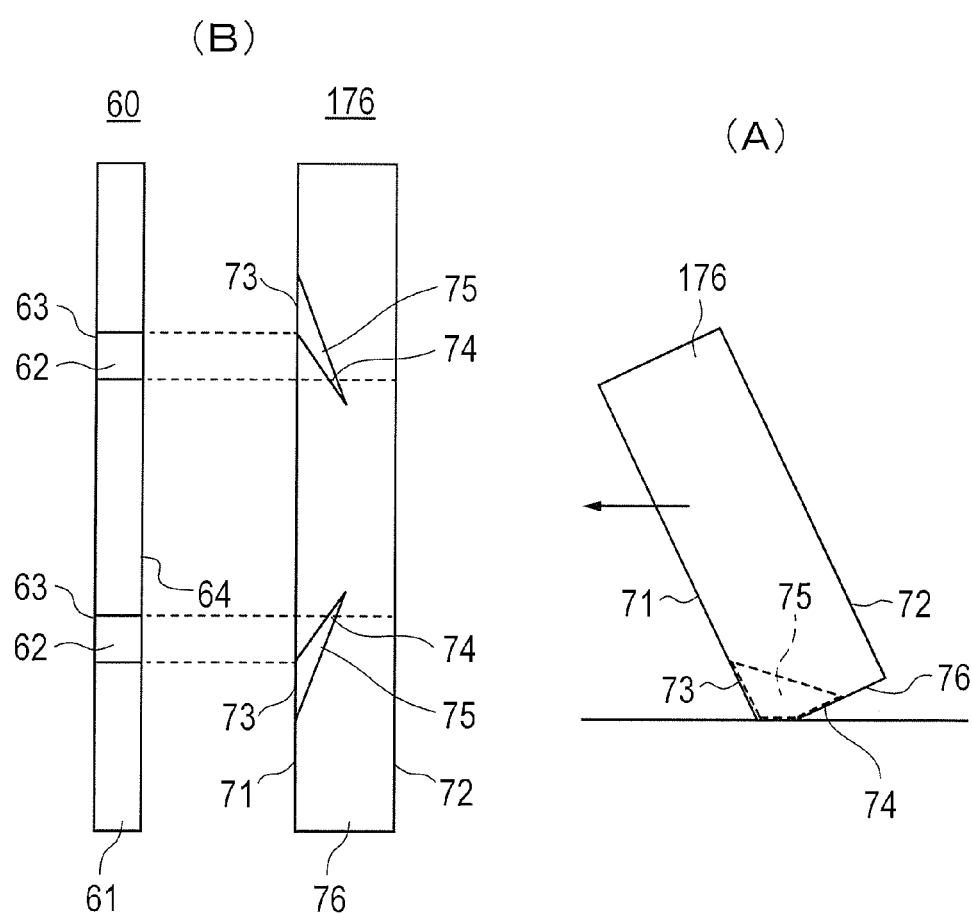
FIGS. 12(A) and 12(B) are respectively a side view and a bottom view illustrating a squeegee according to still another modification.
Figure 13:
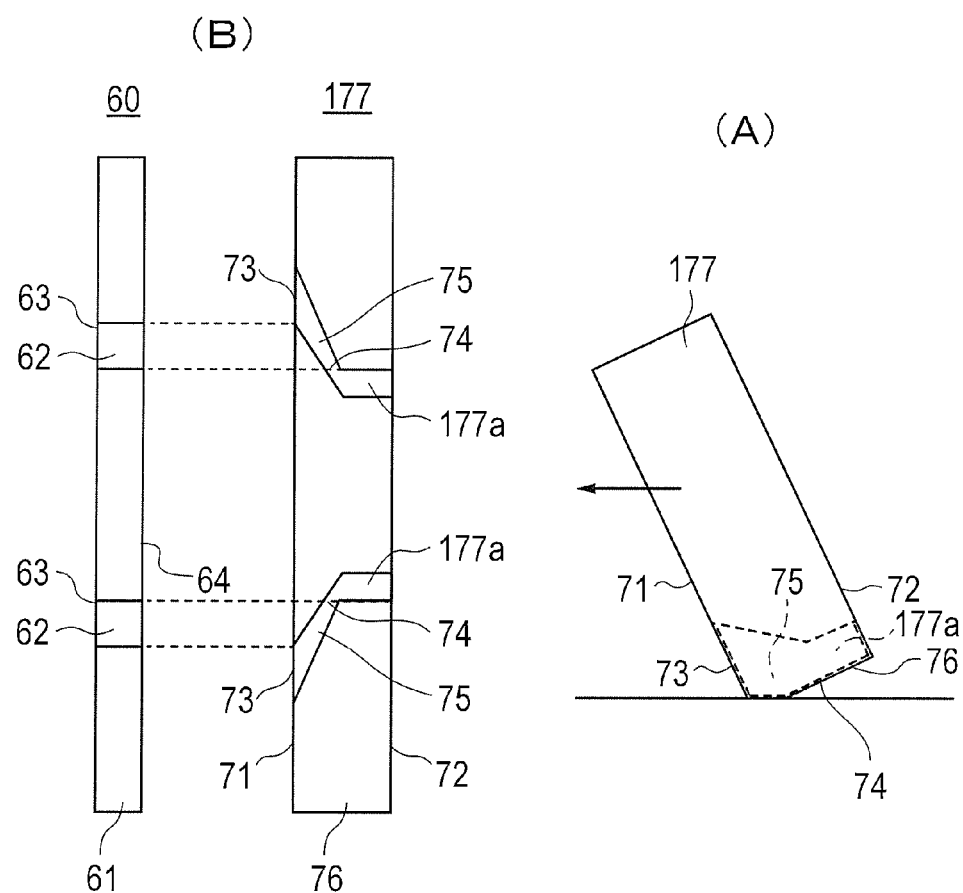
FIGS. 13(A) and 13(B) are respectively a side view and a bottom view illustrating a squeegee according to still another modification.
Figure 14:
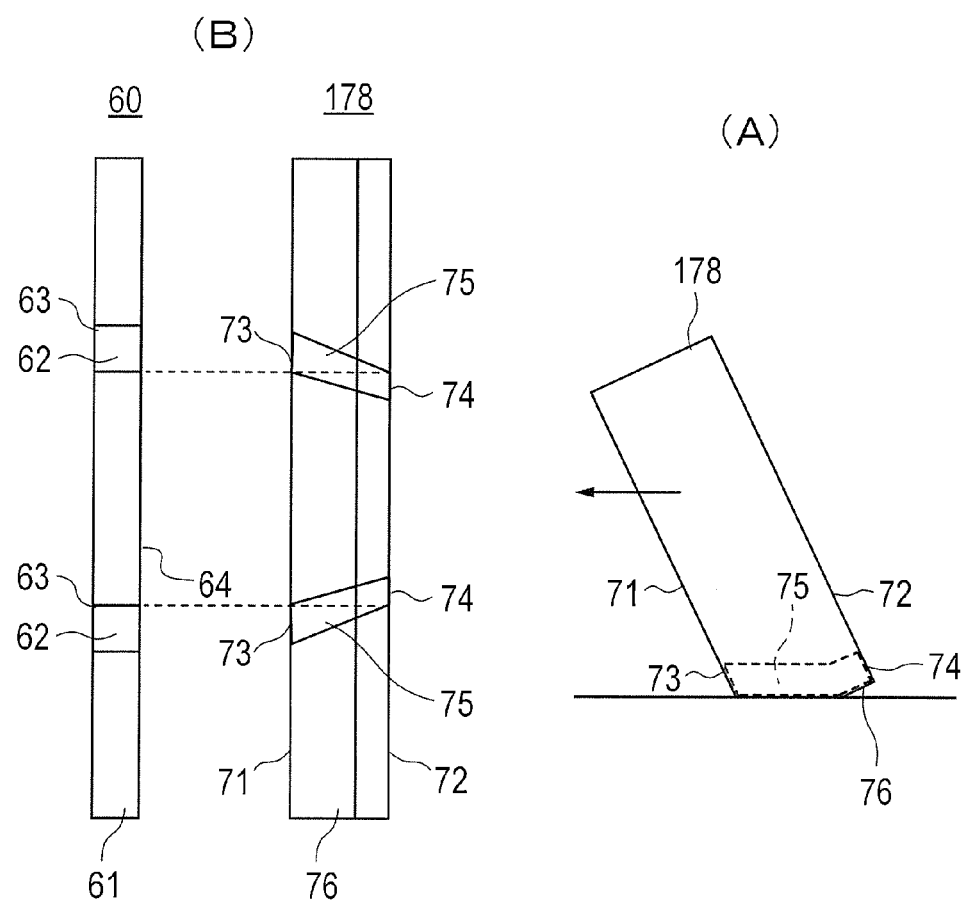
FIGS. 14(A) and 14(B) are respectively a side view and a bottom view illustrating a squeegee according to still another modification.
Figure 15:
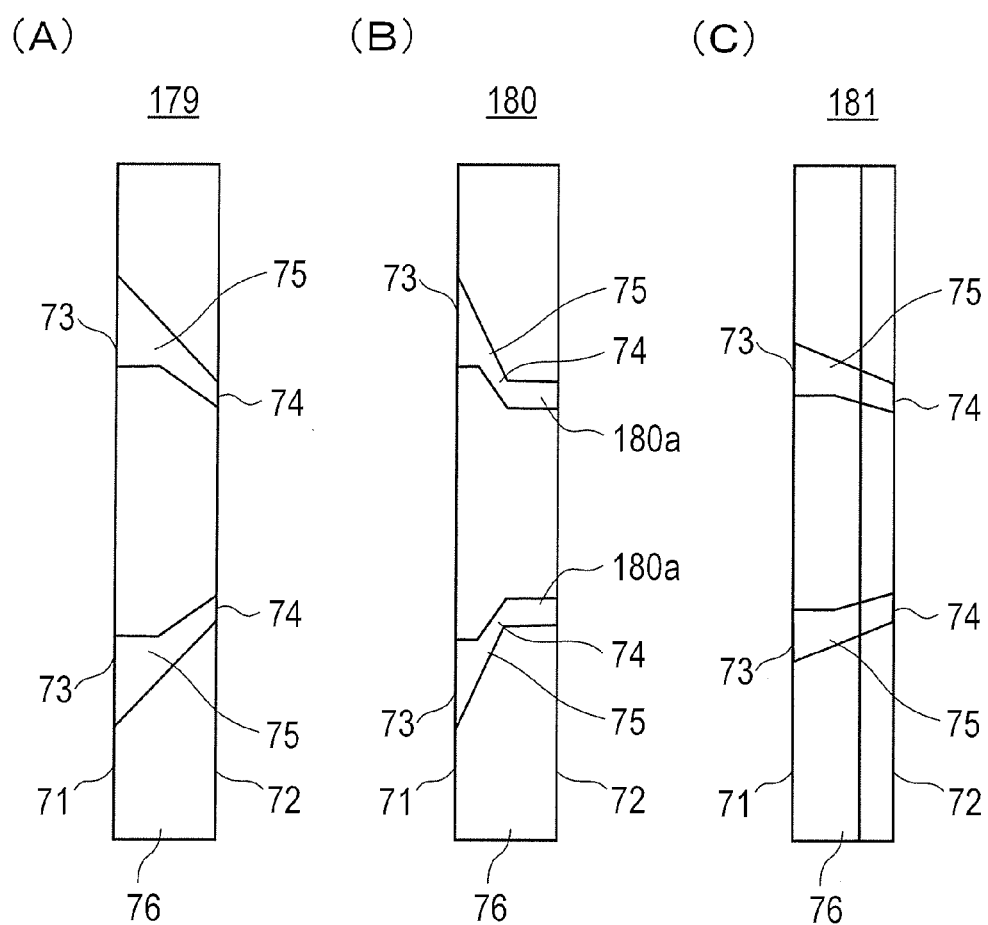
FIGS. 15(A), 15(B), and 15(C) are bottom views illustrating squeegees according to still other modifications.

FIGS. 9(A) and 9(B) are schematic views illustrating a state in which, as the scraper 161 that does not have the escape portion 62 (FIG. 8(A)) slides, the excess ink 81 is discharged to a region in which the scraper 161 does not slide over the screen plate 50.

Referring to FIGS. 9(A) and 9(B), when the scraper 161 slides over the screen plate 50, the excess ink 81 is discharged to a region in which the scraper 161 does not side over the screen plate 50. Because the escape portion 62 is not formed, the excess ink 81, which is discharged when the scraper 161 slides, extends in strip-like shapes along the movement paths of both end portions of the scraper 161. Even when an existing known scraper is used, by only changing the shape of the squeegee 70, the ink recovery mechanism 110 for recovering the excess ink 81 can be provided. Accordingly, an ink recovery function can be additionally provided to an existing screen printing apparatus 101 easily.

(Modifications of Squeegee)

Referring to FIGS. 10 to 17, various modifications of the squeegee 70 will be described.

FIGS. 10(A) and 10(B) are perspective views illustrating squeegees 171 and 172 according to modifications.

As illustrated in FIG. 10(A), the squeegee 171 may have rectangular ink inlets 73. As illustrated in FIG. 10(B), the squeegee 172 may have slit-shaped ink inlets 73. The same applies to the ink outlets 74.

FIGS. 11(A), 11(B), and 11(C) are bottom views illustrating squeegees 173, 174, and 175 according to other modifications.

As illustrated in FIG. 11(A), in the squeegee 173, the opening areas of the ink inlets 73 of the ink paths 75 may be the same as those of the ink outlets 74. As illustrated in FIGS. 11(B) and 11(C), the opening areas of the ink inlets 73 of the squeegees 174 and 175 are greater than those of the ink outlets 74, but the area ratio (the opening areas of the ink inlets 73/the opening areas of the ink outlets 74) may be greater than the area ratio for the ink paths 75 illustrated in FIG. 3(C). The ink paths 75 of the squeegee 174 illustrated in FIG. 11(B) are formed in such a way that the wall surfaces closer to the center in the width direction are substantially parallel to the sliding direction of the squeegee 70. The ink paths 75 of the squeegee 175 illustrated in FIG. 11(C) are formed in such a way that the wall surfaces closer to the center in the width direction and the wall surfaces outward in the width direction have line-symmetrical shapes so that the distances between these wall surfaces uniformly decrease from the ink inlets 73 toward the ink outlets 74.

FIGS. 12(A) and 12(B) are respectively a side view and a bottom view illustrating a squeegee 176 according to still another modification.

As illustrated in FIG. 12(A), only a front part of the bottom surface 76 of the squeegee 176 in the sliding direction may be chamfered. As illustrated in FIG. 12(B), the ink outlets 74 of the squeegee 176 are disposed at substantially the center of the squeegee 176 in the thickness direction from the front side 71 of the squeegee 176. Also with such a structure, as with the embodiment illustrated in FIG. 3(D), regarding a back part of the bottom surface 76 of the squeegee 70 on a side opposite to the sliding direction, a vertical gap between the back part and the screen plate 50 is reduced. Although the ink paths 75 do not extend to the back side 72 of the squeegee 70, the excess ink 81 can be guided to a predetermined region on the back side 72.

FIGS. 13(A) and 13(B) are respectively a side view and a bottom view illustrating a squeegee 177 according to still another modification.

As illustrated in FIG. 13(A), in the squeegee 177, as with the squeegee 176, only a part of the bottom surface 76 of the squeegee 177 in the sliding direction is chamfered. As illustrated in FIG. 13(B), the ink outlets 74 of the ink paths 75 are disposed at substantially the center in the thickness direction from the front side 71 of the squeegee 177. In contrast to the squeegee 176, ink escapes 177a, which are continuous with the ink outlets 74, are formed so as to extend to the back side 72 of the squeegee 177. The ink escapes 177a extend parallel to the sliding direction of the squeegee 177. With such a structure, regarding a back part of the bottom surface 76 of the squeegee 177 on a side opposite to the sliding direction, a vertical gap between the back part and the screen plate 50 is reduced. The excess ink 81 guided out from the ink outlets 74 can be guided through the ink escapes 177a to a predetermined region on the back side 72.

FIGS. 14(A) and 14(B) are respectively a side view and a bottom view illustrating a squeegee 178 according to still another modification.

As illustrated in FIG. 14(A), the bottom surface 76 of the squeegee 178 excluding a small part at the back in the sliding direction may be chamfered. As illustrated in FIG. 14(B), the ink outlets 74 are formed so as to extend to the back side 72. With such a structure, because most part of the bottom surface 76 of the squeegee 178 contacts the screen plate 50, regarding a back part of the bottom surface 76 on a side opposite to the sliding direction, a vertical gap between the back part and the screen plate 50 is reduced. Because the distance from the position at which the bottom surface 76 of the squeegee 178 becomes separated from the screen plate 50 to the back side 72 is small, the excess ink 81 can be easily guided to the positions at which the ink outlets 74 have openings.

FIGS. 15(A), 15(B), and 15(C) are bottom views illustrating squeegees 179, 180, and 181 according to still other modifications.

As illustrated in FIG. 15(A), the ink inlets 73 of the squeegee 179 may be formed so as to be larger than the ink inlets 73 of the squeegee 70 illustrated in FIG. 3(B). As illustrated in FIG. 15(B), the ink inlets 73 of the squeegee 180 may be formed so as to be larger than the ink inlets 73 of the squeegee 176 illustrated in FIG. 12(B), and ink escapes 180a continuous with the ink outlets 74 may be formed so as to extend to the back side 72. As illustrated in FIG. 15(C), the ink inlets 73 of the squeegee 181 may be formed so as to be larger than the ink inlets 73 of the squeegee 178 illustrated in FIG. 14(B). By increasing the opening areas of the ink inlets 73 in this way, when the squeegees 179, 180, and 181 slide, the excess ink 81 can be guided into the ink paths 75 without overflowing from the ink paths 75.

Figure 16:
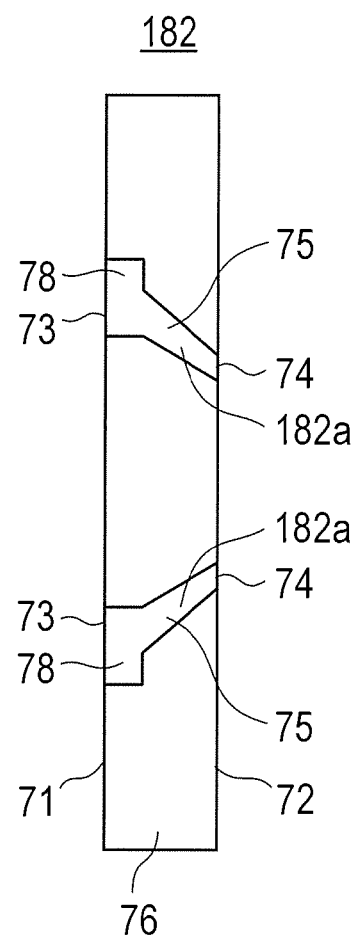
FIG. 16 is a bottom view illustrating a squeegee according to still another modification.

FIG. 16 is a bottom view illustrating a squeegee 182 according to still another modification.

As illustrated in FIG. 16, the ink paths 75 of the squeegee 182 have ink reservoirs 78 for storing the ink 80. The ink reservoirs 78 are continuous with the ink inlets 73. The ink reservoirs 78 each include a region in which the wall surface of the ink path 75 closer to the center in the width direction and the wall surface outward in the width direction are both substantially parallel to the sliding direction of the squeegee 182. By providing the ink reservoirs 78 in this way, when the squeegee 182 slides, overflowing of the excess ink 81 from the ink paths 75 can be further suppressed. In addition, ink escapes 182a continuous with the ink outlets 74 may be formed so as to extend to the back side 72.

Figure 17:
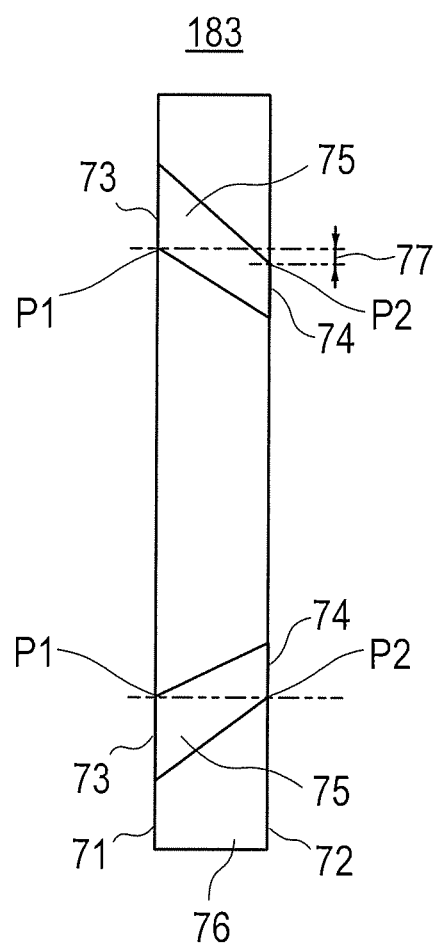
FIG. 17 is a bottom view illustrating a squeegee according to still another modification.

FIG. 17 is a bottom view illustrating a squeegee 183 according to still another modification.

As illustrated in FIG. 17, it is not necessary that the plural ink paths 75 have the same shape, and the ink paths 75 may have different shapes. In the squeegee 183, one of the ink paths 75 shown in an upper part of the figure may be formed so "that the gap 77 is present" and the other ink path 75 shown in a lower part of the figure may be formed so that "the gap 77 is not present". In the ink path 75 shown in the lower part of the figure, the position P2 of an outer part of the ink outlet 74 in the width direction coincides with the position P1 of a center-side part of the ink inlet 73 in the width direction, and therefore the gap 77 is not generated. By forming the plural ink paths 75 so as to have different shapes, the ink 80 can be recovered to an appropriate position in accordance with the shape of the print pattern and the like.

(Examples of Combination of Scraper and Squeegee in Ink Recovery Mechanism 110)

FIGS. 18(A) to 18(D) and FIGS. 19(A) to 19(D) are schematic views illustrating examples of the combination of a scraper and a squeegee.

The ink recovery mechanism 110 can be appropriately modified, as long as the ink recovery mechanism 110 can guide the excess ink 81 from the front side 71 of the squeegee to a region that is on the back side 72 and in which the scraper 60 slides over the screen plate 50, by using the sliding movement of the squeegee 70. Scrapers and squeegees having various sizes or shapes may be used in combination.

Figure 18:
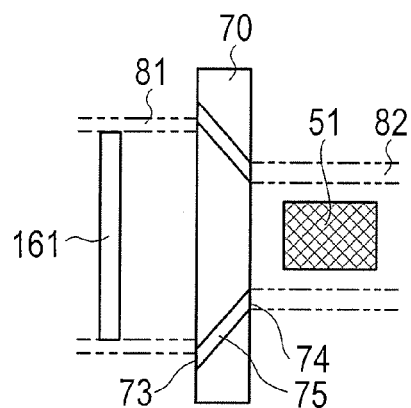
FIGS. 18(A) to 18(D) are schematic views illustrating examples of the combination of a scraper and a squeegee.
Figure 18:
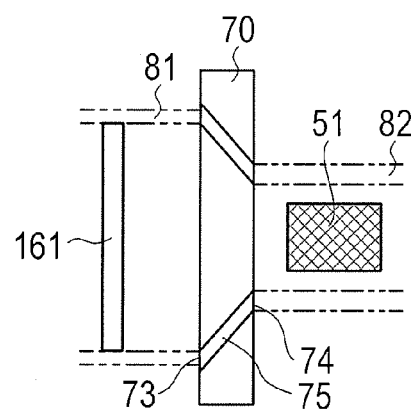
Figure 18:
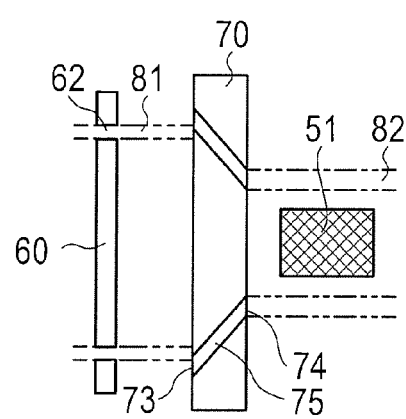
Figure 18:
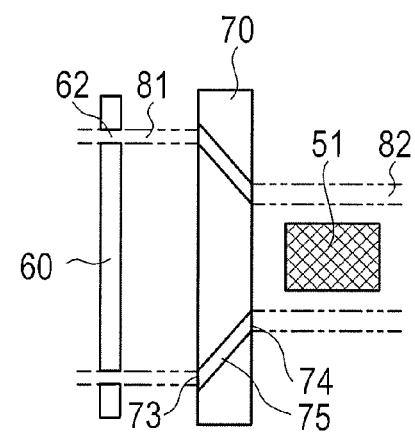

FIGS. 18(A) and 18(B) illustrate examples in which the scraper 161 that does not have the escape portions 62 and the squeegee 70 having the ink paths 75 are used in combination. The ink inlets 73 have the same sizes as the ink outlets 74. However, the positional relationship between the excess ink 81, which extends in strip-like shapes along the movement paths of both end portions of the scraper 161, and the ink inlets 73 is slightly different. In the exemplary combination illustrated in FIG. 18(A), the ink inlets 73 are disposed at positions outward in the width direction from the excess ink 81. On the other hand, in the exemplary combination illustrated in FIG. 18(B), the ink inlets 73 are disposed at positions at substantially the same as the excess ink 81.

FIGS. 18(C) and 18(D) illustrate examples in which the scraper 60 having the escape portions 62 and the squeegee 70 having the ink paths 75 are used in combination. The ink inlets 73 have the same sizes as the ink outlets 74. However, the positional relationship between the excess ink 81, which extends in strip-like shapes along the movement paths of the escape portions 62 of the scraper 60, and the ink inlets 73 is slightly different. In the exemplary combination illustrated in FIG. 18(C), the ink inlets 73 are disposed at positions outward in the width direction from the excess ink 81. In the exemplary combination illustrated in FIG. 18(D), the ink inlets 73 are disposed at positions substantially the same as the excess ink 81.

Figure 19:
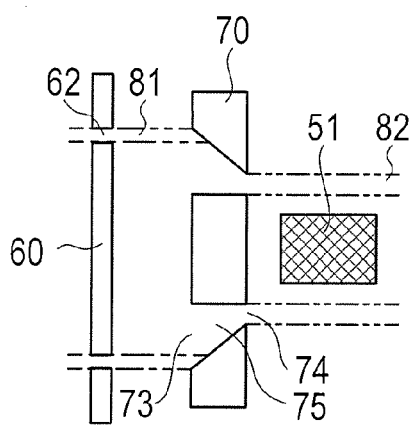
FIGS. 19(A) to 19(D) are schematic views illustrating examples of the combination of a scraper and a squeegee.
Figure 19:
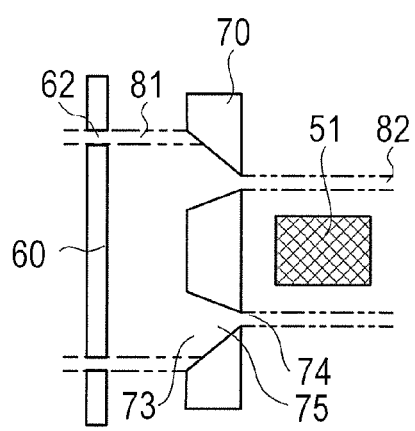
Figure 19:
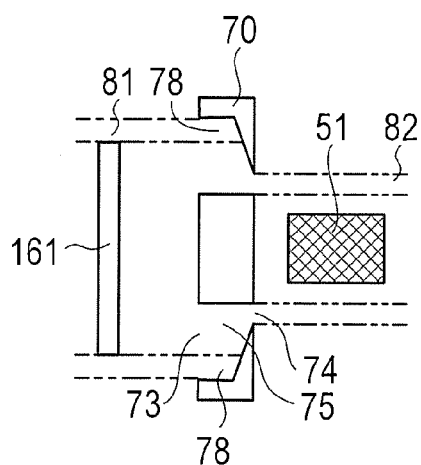
Figure 19:
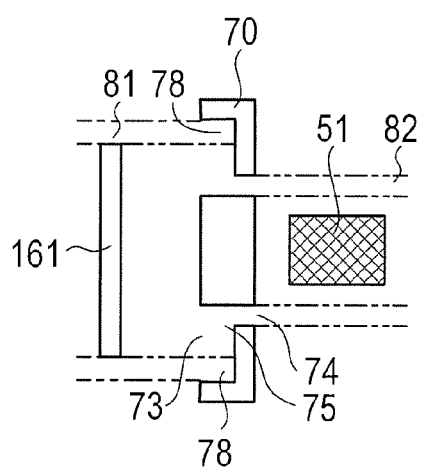

FIGS. 19(A) and 19(B) illustrate examples in which the scraper 60 having the escape portions 62 and the squeegee 70 having the ink paths 75 are used in combination. The ink inlets 73 have sizes larger than those of the ink outlets 74. However, the shapes of the ink paths 75 are slightly different. In the exemplary combination illustrated in FIG. 19(A), the ink paths 75 are each formed so that a wall surface closer to the center in the width direction is substantially parallel to the sliding direction of the squeegee 70. On the other hand, in the exemplary combination illustrated in FIG. 19(B), the ink paths 75 are each formed so that a wall surface closer to the center in the width direction is inclined toward the ink outlet 74. In each of the ink paths 75, the wall surface located outward in the width direction crosses the sliding direction of the squeegee 70. This wall surface, which is located outward in the width direction, is disposed at substantially the same position as the excess ink 81.

FIGS. 19(C) and 19(D) illustrate examples in which the scraper 161 that does not have the escape portions 62 and the squeegee 70 having the ink paths 75 are used in combination. The ink paths 75 include the ink reservoirs 78, which are continuous with the ink inlets 73 and stores the ink 80. The ink reservoirs 78 each include a region in which the wall surface of the ink path 75 closer to the center in the width direction and the wall surface located outward in the width direction are both substantially parallel to the sliding direction of the squeegee 70. However, the shape of the wall surface from the ink reservoir 78 to the ink outlet 74 is slightly different. In the exemplary combination illustrated in FIG. 19(C), the wall surface from the ink reservoir 78 to the ink outlet 74 is formed as an inclined surface that is inclined toward the ink outlet 74.

On the other hand, in the exemplary combination illustrated in FIG. 19(D), the wall surface from the ink reservoir 78 to the ink outlet 74 is formed so as to face the ink inlet 73 and so as to be substantially parallel.

(Modifications of Ink Recovery Mechanism 110)

Figure 20:
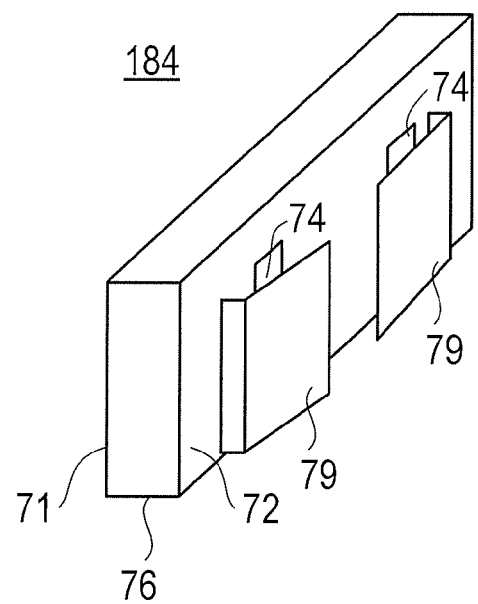
FIGS. 20(A) and 20(B) are respectively a perspective view and a bottom view of a squeegee to which a modification of the ink recovery mechanism is applied.
Figure 20:
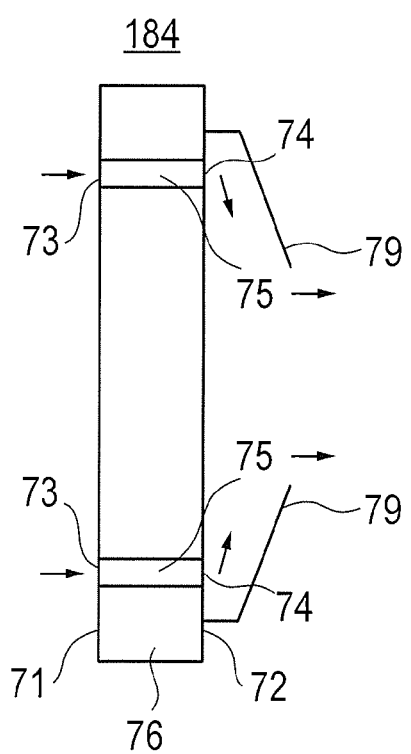

FIGS. 20(A) and 20(B) are respectively a perspective view and a bottom view of a squeegee 184 to which a modification of the ink recovery mechanism 110 is applied.

As illustrated in FIGS. 20(A) and 20(B), the ink recovery mechanism 110 may further include guide plates 79 disposed on the back side 72 of the squeegee 184. The guide plates 79 guide the excess ink 81 to a region in which the scraper 60 slides over the screen plate 50. As with the squeegee 184, the material of the guide plates 79 can be appropriately selected from metals, such as stainless steel; rubber; and resin materials. With such a structure, the shapes of the ink paths 75 formed in the squeegee 184 may be simple straight shapes. In this case, the squeegee 184 can be processed easily. When the squeegee 184 slides, due to the guide plates 79, the excess ink 81 can be easily moved to a desired position, and the ink 80 can be recovered without fail. Because the guide plates 79 are members that are disposed outside of the squeegee 184, it is easy to perform adjustments after the guide plates 79 have been attached, and the direction in which the ink 80 flows (direction in which the recovered ink 80 extends) can be set more flexibly.

OTHER MODIFICATIONS

The present invention is not limited to the embodiments described above and can be modified as necessary. For example, the electrolyte membrane 21 is used as the example of the workpiece W and the catalytic ink is used as an example of the ink 80. However, the present invention is not limited to this case. The present invention can be used in a case where catalytic ink as the ink 80 may be applied to a transfer decal substrate as the workpiece W, or in a case where catalytic ink as the ink 80 is applied to a gas diffusion layer as the workpiece W. Moreover, the present invention can be used in a case of applying an ink to printed matter, such as books, in order to recover and reuse the ink 80 in a case of applying an electro-conductive paste to an electronic component.

The present application is based on Japanese Patent Application No. 2013-093662, filed on Apr. 26, 2013, the entire disclosed contents of which are incorporated herein by reference.

REFERENCE SIGNS LIST 21 electrolyte membrane (workpiece)
22, 23 electrode catalyst layer
50 screen plate
51 opening
52 masking portion
53 screen
60 scraper
61 contact surface
62 escape portion
63 discharge opening
64 pressing surface
70 squeegee
71 front side
72 back side
73 ink inlet
74 ink outlet
75 ink path
76 bottom surface 77 gap
78 ink reservoir
79 guide plate
80 catalytic ink for electrode catalyst layer (ink)
81 excess ink
82 ink guided to back side of squeegee
101 screen printing apparatus
110 ink recovery mechanism
121 sliding unit (drive unit)
122 scraper elevator
123 squeegee elevator (drive unit)
161, 162, 163 scraper
171, 172, 173, 174, 175, 176, 177, 178, 179, 180, 181, 182, 183 squeegee
177a, 180a, 182a ink escape
W workpiece

The invention claimed is:

1. A screen printing apparatus comprising:
a scraper that spreads ink on a screen plate, in which an opening is formed, and fills the opening with the ink by sliding over the screen plate;
a squeegee that transfers the ink, with which the opening is filled, to a surface of a workpiece by sliding over the screen plate while pressing the screen plate against the workpiece; and
an ink recovery mechanism that recovers excess ink that is discharged to a region in which the scraper does not slide over the screen plate,
wherein, by sliding the squeegee, the ink recovery mechanism guides the excess ink from a front side of the squeegee to a region that is on a back side of the squeegee and in which the scraper slides over the screen plate, the front side facing the excess ink and the back side facing in a direction opposite to a direction in which the squeegee slides.

2. The screen printing apparatus according to claim 1, wherein the ink recovery mechanism includes
an ink path that connects an ink inlet having an opening in the front side of the squeegee to an ink outlet having an opening at a position closer to the back side than the ink inlet, and
a drive unit that slides the squeegee over the screen plate while pressing the screen plate against the workpiece, and
wherein the ink recovery mechanism guides the excess ink from the ink inlet, into the ink path, and out from the ink outlet.

3. The screen printing apparatus according to claim 2, wherein an opening area of the ink inlet of the ink path is greater than an opening area of the ink outlet.

4. The screen printing apparatus according to claim 2, wherein the ink path includes an ink reservoir for storing the ink, the ink reservoir being continuous with the ink inlet.

5. The screen printing apparatus according to claim 1, wherein the ink recovery mechanism further includes a guide plate that is disposed on the back side of the squeegee and that guides the excess ink to the region in which the scraper slides over the screen plate.

6. The screen printing apparatus according to claim 1, wherein the screen plate includes a masking portion that does not allow the ink to pass therethrough, and the ink recovery mechanism guides the excess ink to a region of the screen plate in which the masking portion is formed.

7. The screen printing apparatus according to claim 1, wherein the ink recovery mechanism recovers the excess ink at a position outward in a width direction from a position of the excess ink when viewed in the width direction, which is a direction crossing the direction in which the squeegee slides.

8. The screen printing apparatus according to claim 1, wherein the scraper has a contact surface between both end portions thereof in a width direction crossing a direction in which the scraper slides, the contact surface contacting the screen plate continuously and without a gap.

9. The screen printing apparatus according to claim 1, wherein the scraper includes an escape portion that is formed by cutting out a part of a contact surface along which the scraper contacts the screen plate, the escape portion having a discharge opening that faces in a direction opposite to a direction in which the scraper slides.

10. The screen printing apparatus according to claim 1,
wherein the workpiece is an electrolyte membrane on which an electrode catalyst layer is to be formed, or a transfer decal substrate, and
wherein the ink is catalytic ink for the electrode catalyst layer.

11. A screen printing method comprising:
spreading ink on a screen plate, in which an opening is formed, and filling the opening with the ink by sliding a scraper over the screen plate; and
transferring the ink, with which the opening is filled, to a surface of a workpiece by sliding a squeegee over the screen plate while pressing the screen plate against the workpiece, wherein, in the transfer operation, excess ink that is discharged to a region in which the scraper does not slide over the screen plate is recovered,
wherein, in the operation of recovering the excess ink, by sliding the squeegee, the excess ink is guided from a front side of the squeegee to a region that is on a back side of the squeegee and in which the scraper slides over the screen plate, the front side facing the excess ink and the back side facing in a direction opposite to a direction in which the squeegee slides, and the excess ink, which has been guided to the region on the back side, is spread again over the screen plate by next sliding of the scraper.

* * * * *